(12) United States Patent
Sharifi Mehr

(10) Patent No.: US 9,477,958 B2
(45) Date of Patent: *Oct. 25, 2016

(54) CREDIT CARD READER AUTHENTICATOR

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/981,740

(22) Filed: Dec. 28, 2015

(65) Prior Publication Data

US 2016/0110716 A1 Apr. 21, 2016

Related U.S. Application Data

(63) Continuation of application No. 14/135,422, filed on Dec. 19, 2013, now Pat. No. 9,230,254.

(51) Int. Cl.
*G06Q 20/40* (2012.01)
*G06Q 20/34* (2012.01)
*G06Q 20/20* (2012.01)
*G06Q 20/24* (2012.01)
*G07F 7/08* (2006.01)
*G06K 7/08* (2006.01)
*G06Q 20/32* (2012.01)

(52) U.S. Cl.
CPC .......... *G06Q 20/4014* (2013.01); *G06K 7/087* (2013.01); *G06Q 20/204* (2013.01); *G06Q 20/24* (2013.01); *G06Q 20/3226* (2013.01); *G06Q 20/3567* (2013.01); *G07F 7/088* (2013.01); *G06Q 2220/00* (2013.01)

(58) Field of Classification Search
USPC ...................................... 235/380; 705/64, 72
See application file for complete search history.

(56) References Cited

U.S. PATENT DOCUMENTS

| | | | |
|---|---|---|---|
| 2004/0019570 A1* | 1/2004 | Bolle | G06F 21/32 705/64 |
| 2013/0144792 A1* | 6/2013 | Nilsson | G06Q 20/20 705/67 |
| 2014/0372320 A1* | 12/2014 | Goldfarb | G06Q 20/4012 705/72 |
| 2015/0038130 A1* | 2/2015 | Mao | H04W 8/22 455/418 |

* cited by examiner

*Primary Examiner* — Allyson Trail
(74) *Attorney, Agent, or Firm* — Davis Wright Tremaine LLP

(57) ABSTRACT

A credit card reader is attached to a mobile device to process credit card transactions at the point of sale. A user of the credit card reader slides an authenticator card through the credit card reader to activate the credit card reader. Accordingly, the credit card reader may compare data stored in the authenticator card to an expected value for the data to determine whether the user is authorized to utilize the credit card reader. If there is a match, the credit card reader displays a unique password, known to the user, which the user can use to verify that the credit card reader is authentic. Further, if there is a match, the credit card reader may allow the user to process credit card transactions through the credit card reader.

20 Claims, 11 Drawing Sheets

CREDIT CARD READER AUTHENTICATOR

CROSS REFERENCE TO RELATED APPLICATIONS

This application incorporates by reference for all purposes the full disclosure of co-pending U.S. patent application Ser. No. 14/135,422, filed Dec. 19, 2013, entitled "CREDIT CARD READER AUTHENTICATOR."

BACKGROUND

As merchants and other entities continue to utilize mobile payment solutions to support their business needs, the security issues inherent in the use of a mobile device for such payment solutions have garnered additional attention. For example, a merchant or other entity may attach a credit card reader to his/her mobile device to process credit card payments immediately. These credit card readers may be tamper resistant and may be configured to provide an acceptable level of encryption to ensure that credit card information is not compromised. Thus, when a credit card is swiped through the credit card reader, the credit card information may be encrypted and transferred to an application installed on the mobile device. The application may not be able to decrypt this information and may be required to submit the information to a secure payment gateway to process the transaction. Therefore, even if the merchant's mobile device has been compromised, the credit card information may not be compromised. However, if the merchant's mobile device has been compromised and the credit card reader has been replaced with a malicious reader that comprises similar features as the credit card reader but does not encrypt the credit card information, the credit card information may be compromised. This may result in financial loss for the merchant and his/her customers.

BRIEF DESCRIPTION OF THE DRAWINGS

Various embodiments in accordance with the present disclosure will be described with reference to the drawings, in which.

DETAILED DESCRIPTION

Figure 1:
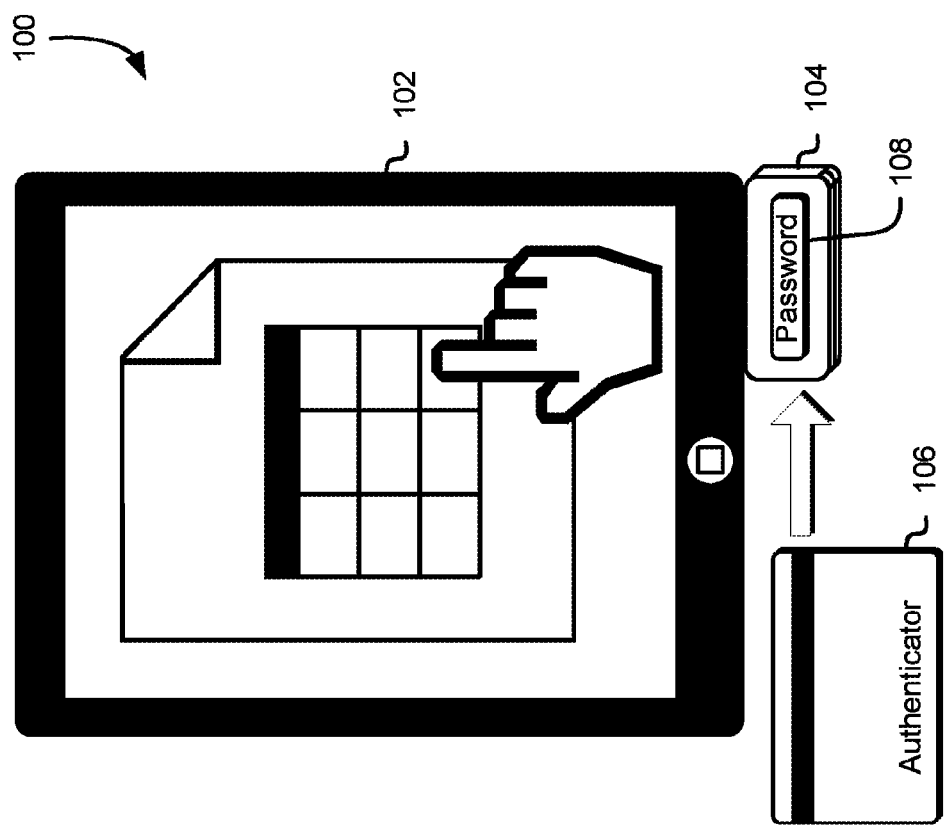
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to a credit card reader authenticator for authenticating credit card readers before processing credit card transactions. In an embodiment, an entity (e.g., an organization or user) may obtain a credit card reader from an authorized dealer (e.g., a payment processor) for use with a mobile device. The entity may be a merchant who is also a customer of the payment processor that utilizes mobile payment solutions to support his/her business needs. For instance, the entity may utilize a credit card reader attached to a mobile device to process customer transactions, wherein the customer utilizes a credit card to purchase goods or services provided by the entity. The credit card reader provided to the merchant by the payment processor may comprise a plurality of components. For instance, the credit card reader may comprise a liquid-crystal display (LCD) element, which may be configured to display authentication information which the merchant may utilize to ensure the credit card reader is authentic. Additionally, in some embodiments, the LCD element can be configured display credit card transaction information in addition to the authentication information.

In an embodiment, when the merchant first attaches the credit card reader to his/her mobile device or at another time when authentication is desired or necessary, the merchant slides an authenticator card through the credit card reader to verify that the credit card reader is authentic and may be used to process credit card transactions. The authenticator card may be provided to the merchant by the payment processor when the merchant first obtains the credit card reader. The authenticator card may be configured to persistently store a password or other credential information that may be used by the credit card reader to verify that the merchant is authorized to utilize the credit card reader. Accordingly, when the merchant slides the authenticator card through the credit card reader attached to the mobile device, the credit card reader may obtain the password or other credential information from the authenticator card and determine whether the authenticator card is authentic. If the authenticator card is authentic, the credit card reader may display a different password or other credential information that may be unique to the merchant. For instance, the payment processor may configure the credit card reader to display an image or string of characters familiar to the merchant (e.g., provided by the merchant or provided to the merchant by the payment processor). Thus, the merchant may view the display and, if the password or other credential information displayed is correct, the merchant may utilize the credit card reader to process one or more credit card transactions.

In an alternative embodiment, when the merchant first attaches the credit card reader to his/her mobile device or in response to one or more other triggers, the credit card reader may display a one-time password which the merchant may use to authenticate the credit card reader. For instance, the payment processor may provide the merchant with both a credit card reader and a one-time password token. The credit card reader and the one-time password token may be synchronized temporally and with a common seed value such that both devices may display the same one-time password at the same time. Accordingly, the merchant may use the one-time password token to determine whether the displayed one-time password on the credit card reader matches the one-time password displayed on the one-time password token. If the passwords match, then the merchant may know that the credit card reader is authentic and may begin to process credit card transactions through the credit card reader. The one-time passwords may comprise a series of numbers, an alphanumeric string, an alphabetic string and the like.

In another alternative embodiment, the authenticator card provided to the merchant in addition to the credit card reader may comprise an LCD element, which may be used to display a password or credential information upon authentication of the credit card reader. When the merchant slides the authenticator card through the credit card reader, the credit card reader may transmit a password or other credential information to the authenticator card. Accordingly, the authenticator card may compare the password or other credential information received from the credit card reader to a password or other credential information stored within the authenticator card to determine whether there is a match. If there is a match, the authenticator card may, through the LCD element, display that the authentication of the credit card reader has been successful, as well as a different password or credential information that may be used by the merchant to ensure that the authentication process is valid and, thus, the credit card reader is authentic.

In this manner, a merchant may be able to attach a credit card reader to a mobile device and verify that the credit card reader is authentic prior to processing credit card transactions. In addition, the techniques described herein facilitate additional technical advantages. For example, because, in some embodiments, the credit card reader may display a password or other credential information that may be unique to the merchant or unique to the credit card reader, the merchant may immediately know whether the credit card reader has been tampered with prior to processing any credit card transactions using the credit card reader. This, in turn, may reduce the risk of financial loss to the merchant and his/her customers. Additional uses are also enabled by the various techniques described herein.

FIG. 1 shows an illustrative example of an environment 100 in which various embodiments may be practiced. In the environment 100, a merchant may utilize a mobile device 102 for a variety of purposes. For instance, the mobile device 102 may comprise a plurality of applications, which the merchant may utilize to support his/her business needs, particularly processing credit card transactions at the point of sale. These applications may be persistently stored in memory, such as a random-access memory (RAM) chip or a hard drive within the mobile device 102. Further, the mobile device 102 may comprise, within a housing for a variety of components, one or more processors configured to execute a series of instructions stored in the memory, such as the applications and/or an operating system for managing the various applications stored therein. The mobile device 102 may further comprise a display unit usable for providing the merchant with information and other data with regard to a particular application or operating system currently in use. For instance, the merchant may utilize an application on the mobile device 102 to process credit card transactions at the point of sale. Thus, this application may be configured to cause the display unit to provide information regarding the transaction, such as the amount charged to the credit card, the items being purchased by a customer, credit card validation information (e.g., whether the credit card has been accepted or declined) and other transaction information. The mobile device 102 may additionally comprise one or more ports, which may be used to introduce one or more peripheral devices that may be used in conjunction with the mobile device 102 and one or more applications installed therein. While the use of a tablet computer, as illustrated in FIG. 1, is used for the purpose of illustration, other mobile devices may be used. For instance, the mobile device 102 may be a laptop computer, smartphone device or any other mobile device comprising a plurality of components necessary to process credit card transactions.

Accordingly, as illustrated in FIG. 1, the environment 100 includes a credit card reader 104. As noted above, the merchant may utilize the mobile device 102 to process one or more credit card transactions at the point of sale. Thus, a credit card reader 104 may be required to obtain the credit card information included in the customer's credit card in order to process a customer transaction. The credit card reader 104 may comprise a plurality of components necessary to process one or more credit card transactions at the point of sale. For instance, the credit card reader may comprise a credit card slot, which may be used to slide a credit card or other card through the credit card reader 104 and obtain information from the card for a variety of purposes. For instance, when a merchant slides a credit card through the credit card reader 104 (e.g., the credit card slot), the credit card reader 104 may obtain information stored on the card (e.g., account number, account holder's name, expiration date, etc.) and encrypt this information for payment processing. The credit card reader 104 may further comprise one or more connectors, which may be used to introduce the credit card reader 104 to the mobile device 102. The one or more connectors may be configured to transmit information to the mobile device 102, through the one or more ports. Additionally, the one or more connectors, when used to connect the credit card reader 104 to the mobile device 102, may serve as a power conduit usable to power the credit card reader 104.

The credit card reader 104 may further comprise a plurality of other hardware components, including a random-access memory (RAM) chip or a hard drive, which may be collectively configured to allow a merchant to authenticate the credit card reader 104 prior to processing credit card transactions at the point of sale. For instance, in an embodiment, the credit card reader 104 includes one or more processors configured to execute a series of instructions stored in the memory that may cause a display unit 108 on the credit card reader 104 to display a password, which may be used by the merchant to authenticate the credit card reader 104. For example, as illustrated in FIG. 1, when the merchant slides an authenticator card 106 through the credit card slot of the credit card reader 104, the credit card reader 104 may obtain relevant credential information (e.g., a password, cryptographic key, or other credential information) from the authenticator card 106, which the credit card reader 104 may use to determine if the merchant may utilize the credit card reader 104 to process credit card transactions. Accordingly, the credit card reader 104 may be configured to compare the received credential information obtained from the authenticator card 106 to an expected value for the credential information persistently stored within the credit card reader 104. If there is a match, then the credit card reader 104 may, through the display unit 108, display a password which may be unique to the merchant. For instance, as part of obtaining the credit card reader 104 from an authorized dealer, the merchant may specify what password may be shown on the credit card reader 104 upon sliding the authenticator card 106 through the credit card reader 104.

In an alternative embodiment, the credit card reader 104 is configured to display one or more one-time passwords through the display unit 108. The merchant, when obtaining the credit card reader 104, may receive a one-time password token which may be configured to be synchronized to the credit card reader 104 such that the one-time passwords displayed on the credit card reader 104 and the one-time password token match. Thus, when the merchant introduces the credit card reader 104 to the mobile device 102, the merchant may verify whether the one-time passwords displayed on the credit card reader 104 and the one-time password token match. If the passwords match, then the credit card reader 104 may be considered to be authentic and the merchant may use the credit card reader 104 to process credit card transactions at the point of sale.

As noted above, the credit card reader 104 may be configured to encrypt credit card information that is to be transmitted to a payment processor. Accordingly, when a credit card is used through the credit card reader 104, the credit card reader 104 may encrypt the information obtained from the credit card and utilize the mobile device 102 to communicate with one or more communications networks, such as the Internet, to transmit the encrypted information to the payment processor. Thus, if the mobile device 102 has been compromised, an entity that receives this information may not be able to obtain any credit card information but instead may obtain unreadable encrypted information.

While credit cards are used throughout the present disclosure for the purpose of illustration, the credit card reader 104 may be used for other types of cards. For instance, the credit card reader 104 may be configured to accept, through the credit card slot, one or more loyalty program cards in addition to, or instead of, credit cards. Thus, the credit card reader 104 may be used to transmit information regarding a customer's purchase to a loyalty program server in order to reward the customer for his/her purchase.

Figure 2:
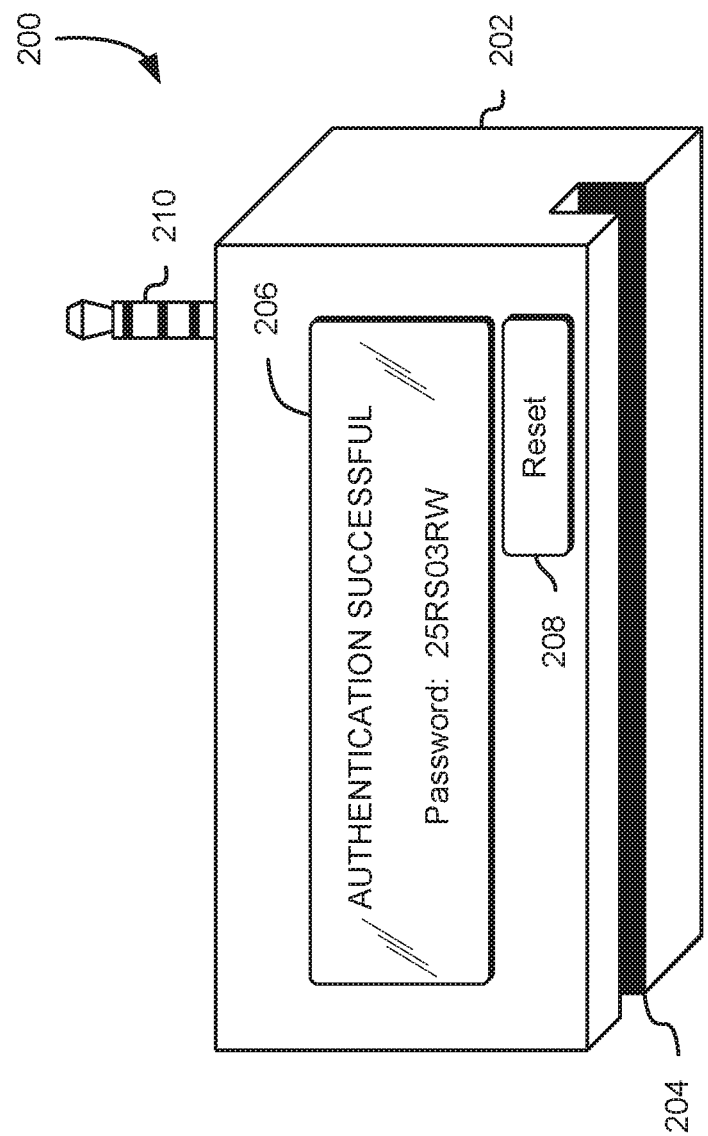
FIG. 2 shows an illustrative example of a credit card reader displaying a successful authentication result in accordance with at least one embodiment.

As noted above, a merchant may utilize a credit card reader to process one or more credit card transactions at the point of sale to support his/her business needs. Further, the credit card reader may include one or more features, which the merchant may utilize to authenticate the credit card reader prior to processing any credit card transactions. Accordingly, FIG. 2 shows an illustrative example of an environment 200 that includes a credit card reader 202 configured to display a successful authentication result as a consequence of a merchant introducing an authenticator card through the credit card reader 202 in accordance with at least one embodiment. The credit card reader 202 may include a housing for a variety of components configured to operate together to determine whether a card introduced through the credit card reader 202 comprises authentication information and, if so, display a password which may be known to the merchant. For instance, the credit card reader 202 may comprise, within the housing, one or more processors configured to execute a series of instructions stored in memory, such as a RAM chip or a hard drive. The housing may be constructed using any material but should preferably be comprised of a durable material such as a rigid, durable plastic or light weight metal (e.g., aluminum or thin gauge steel). Preferably, in order to make the credit card reader 202 portable, in conjunction with a mobile device, the credit card reader 202 may be constructed such that the credit card reader 202 and the mobile device it is attached to may fit in a human hand.

The credit card reader 202 may additionally comprise a credit card slot 204 configured to enable a merchant to introduce one or more credit cards or other cards to the credit card reader 202. The credit card reader 202 may be configured to obtain information from each card that is introduced through the credit card slot 204. For instance, when a merchant slides a credit card through the credit card slot 204 to process a credit card transaction, the credit card reader 202, through the credit card slot 204 may obtain necessary information regarding the customer's credit account. This may include the account holder's name, account number, credit card expiration date and other information that may be required, by a payment processor, to authorize the transaction. The credit card slot 204 may be configured to obtain information from cards comprising a magnetic stripe or other source of credit information. Thus, the credit card slot 204 may comprise one or more components necessary to decode the information stored within the card (e.g., north/south pole directions for the magnets included in the magnetic stripe, etc.). In an embodiment, the credit card slot 204 is configured to obtain information from an authenticator card, provided by the merchant, which may be used to activate the credit card reader 202 and to further provide a password or other credential information to the merchant, which may be used, by the merchant, to authenticate the credit card reader 202.

The credit card reader 202 may include a display unit 206 configured to provide a merchant with information necessary to authenticate the credit card reader 202. As noted above, the merchant may introduce, through the credit card slot 204, an authenticator card, which may comprise a password or other credential information usable by the credit card reader 202 to allow the merchant to process credit card transactions using the credit card reader 202. Accordingly, when the merchant introduces an authenticator card through the credit card slot 204, the credit card reader 202 may verify whether the information obtained from the authenticator card matches information persistently stored within the credit card reader 202. If there is a match, the credit card reader 202 may transmit one or more signals to the display unit 206, which may cause the display unit 206 to display a password or other credential information that may be unique to the merchant. Alternatively, the credit card reader 202 may be configured to obtain data from the authenticator card introduced through the credit card slot 204 and utilize a non-invertible function (e.g., key derivation or other function) to derive a password. Accordingly, the credit card reader 202 may transmit one or more signals to the display unit 206, which may cause the display unit 206 to display this derived password without requiring a match. Further, the derived password may be unique to the merchant or to the credit card reader 202 such that the merchant may be able to authenticate the credit card reader 202 based at least in part on this derived password.

In this illustrative example, the display unit 206 has displayed a password, "25RS03RW." The merchant may have instructed the payment processor or other authorized dealer that provides credit card readers to merchants to configure the credit card reader 202 to cause the display unit 206 to display this particular password if the merchant's authenticator card is introduced. While the use of alphanumeric passwords are used extensively throughout the present disclosure for the purpose of illustration, other passwords and credential information may be provided to the merchant upon introducing a valid authenticator card through the credit card reader 202. For instance, the credit card reader 202 may be configured to cause the display unit 206 to display a unique image or string of symbolic characters which may be familiar to the merchant. Further, the credit card reader 202 may be configured to produce one or more audible responses unique to the merchant instead of, or in addition to, the password displayed on the display unit 206.

Once the password has been displayed on the display unit 206 for a particular period of time, the credit card reader 202 may transmit one or more signals to the display unit 206 that, when processed by the display unit 206, cause the display unit 206 to remove this particular password from the display unit 206 after a certain period of time. For instance, the password may be removed from the display unit 206 after a few seconds have elapsed. Thus, the password may be displayed for a short period of time to prevent others from viewing the password and/or to conserve energy.

The credit card reader 202 may further comprise one or more user interface devices 208 for interaction with the credit card reader 202. For instance, as illustrated in FIG. 2, the credit card reader 202 may comprise a reset button 208 that the merchant may utilize to reset the credit card reader 202 such that an authenticator card may need to be reintroduced to the credit card reader 202 to enable the credit card reader 202 to process credit card transactions. While the use of a reset button 208 is used throughout the present disclosure for the purpose of illustration, the credit card reader 202 may comprise other user interface devices. For instance, the credit card reader 202 may comprise a power button usable to turn the credit card reader 202 on or off, a volume button, a display contrast button and other buttons.

As noted above, the credit card reader 202 may be attached to a mobile device to enable a merchant to transmit credit card information, from the credit card reader 202 and through the mobile device, to a payment processor. Accordingly, the credit card reader 202 may include a connector 210, which may be used to attach the credit card reader 202 to one or more ports included on the mobile device. The connector 210 may be configured to transfer an electric charge from the mobile device to the credit card reader 202 when the credit card reader 202 is attached to the mobile device. This electric charge may be used to power the credit card reader 202 and enable the credit card reader 202 to process one or more credit card transactions and display relevant information on the display unit 206 when a merchant introduces an authenticator card through the credit card slot 204. The connector 210 may further be used to transmit information from the credit card reader 202 to the mobile device, such as encrypted credit card information (e.g., account holder's name, credit card account number, credit card expiration date, etc.), for transmittal to the payment processor.

In an alternative embodiment, the credit card reader 202 can be connected to a power supply other than the mobile device in order to obtain an electric charge usable to power the credit card reader 202. For instance, the connector 210 may be configured to transfer an electric charge from an alternating current (AC) adaptor inserted into an electric outlet when the credit card reader 202 is attached to the AC adaptor. Accordingly, in an embodiment, when the credit card reader 202 receives, through the connector 210, an electric charge from the AC adaptor, the credit card reader 202 may display relevant information on the display unit 206 when a merchant introduces an authenticator card through the credit card slot 204.

In an alternative embodiment, the credit card reader 202 can be configured to communicate with a mobile device using short range communications instead of, or in addition to, use of the connector 210. For instance, the credit card reader 202 may be configured to utilize a near field communication (NFC) standard to establish communication with the mobile device when placed in close proximity to the mobile device. In addition to utilizing NFC, other methods for establishing short-range, inter-device communications with the mobile device may also be utilized in accordance with the systems and methods described in the present disclosure. For instance, such compatible technologies include, but are not limited to, induction wireless, infrared wireless (e.g., technologies operating according to specifications and protocols provided by the Infrared Data Association) or ultra wideband formats. In some embodiments, the devices can utilize short-range, low power and high-frequency radio transmissions, such as Bluetooth®. In other embodiments, the credit card reader 202 and the mobile can support acoustic-based data transfer. For example, the credit card reader 202 may include software components and a speaker that enable the credit card reader 202 to broadcast data to the mobile device as sound waves, while the mobile device may include software components and microphone that enable the mobile device to receive the data embedded in the sound waves.

Thus, one or more of radio signal-based data transfer (e.g., NFC or Bluetooth®), light-based data transfer (e.g., infrared data transfer), an acoustic-based data transfer (e.g., sound wave-embedded data) or magnetic field-based transfer may be used for inter-device communication. In such embodiments, if included, the connector 210 can be used as a mechanical connector that is then inserted into a port of the mobile device for mechanical stability.

Figure 3:
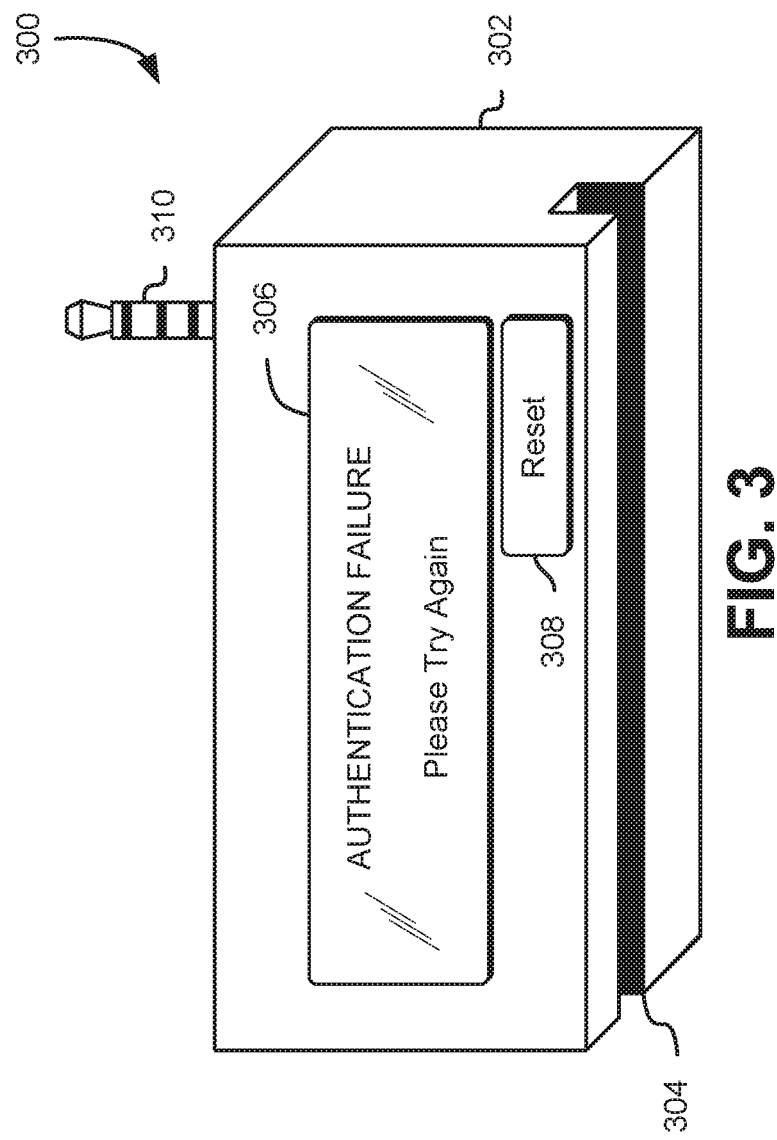
FIG. 3 shows an illustrative example of a credit card reader displaying a failed authentication result in accordance with at least one embodiment.

If the merchant attempts to introduce an authenticator card through a credit card slot on the credit card reader to enable the merchant to process credit card transactions, but the authenticator card is invalid or damaged, the credit card reader may not enable the merchant to process credit card transactions through the credit card reader. Accordingly, FIG. 3 is an illustrative example of a credit card reader 302 configured to display an error message if the credit card reader 302 is unable to validate the merchant's authenticator card in accordance with at least one embodiment. As illustrated in FIG. 2, the credit card reader 302 may comprise a housing which, in turn, may comprise one or more processors and computer-readable media such as RAM chips or a hard drive. Additionally, the credit card reader 302 may comprise a credit card slot 304 for introducing a credit card, authenticator card or other cards to the credit card reader, a display unit 306 for displaying relevant information usable by the merchant to authenticate the credit card reader 302, one or more user interface devices 308 for the merchant to interact with the credit card reader 302 and a connector 310 for attaching the credit card reader 302 to the mobile device.

If the merchant or other user of the credit card reader 302 introduces an authenticator card through the credit card slot 304, the credit card reader 302 may obtain information stored on the authenticator card that may be used to determine whether the information (e.g., a password or other credential information) obtained is valid. For instance, as noted above, the credit card reader 302 may be configured to compare the obtained credential information to expected values for the credential information that may be persistently stored within the credit card reader 302. Accordingly, if the obtained credential information does not match any of the expected values for the credential information, the credit card reader 302 may transmit one or more signals to the display unit 306 that, when processed by the display unit 306, may cause the display unit 306 to display, as illustrated in FIG. 3, an error message or other message that may be used to inform the merchant or other user that the authentication of the authenticator card has failed. The credit card reader 302 may also prohibit the merchant from processing credit card transactions using the credit card reader 302 until he/she has introduced a valid authenticator card through the credit card slot 304. Further, the credit card reader 302 may not display, through the display unit 306, a password or other credential information that may be unique to the merchant and that may be usable, by the merchant, to authenticate the credit card reader 302.

In an alternative embodiment, if the obtained credential information does not match any of the expected values for the credential information, the credit card reader 302 transmits one or more signals to the display unit 306 that, when processed by the display unit 306, causes the display unit 306 to display erroneous information. The erroneous information displayed on the display unit 306 may be formatted such that it appears to be authentication information but, in reality, is not valid. Additionally, if the obtained credential information does not match any of the expected values for the credential information, the credit card reader 302 may allow the user of the credit card reader 302 to utilize the credit card reader 302 to process credit card transactions. However, any information garnered from a credit card introduced through the credit card slot 304 may be transmitted to another entity, such as a law enforcement agency or a payment processor security group. In this manner, any unauthorized users of the credit card reader 302 may be unable to detect that authentication of the credit card reader 302 has failed.

Figure 4:
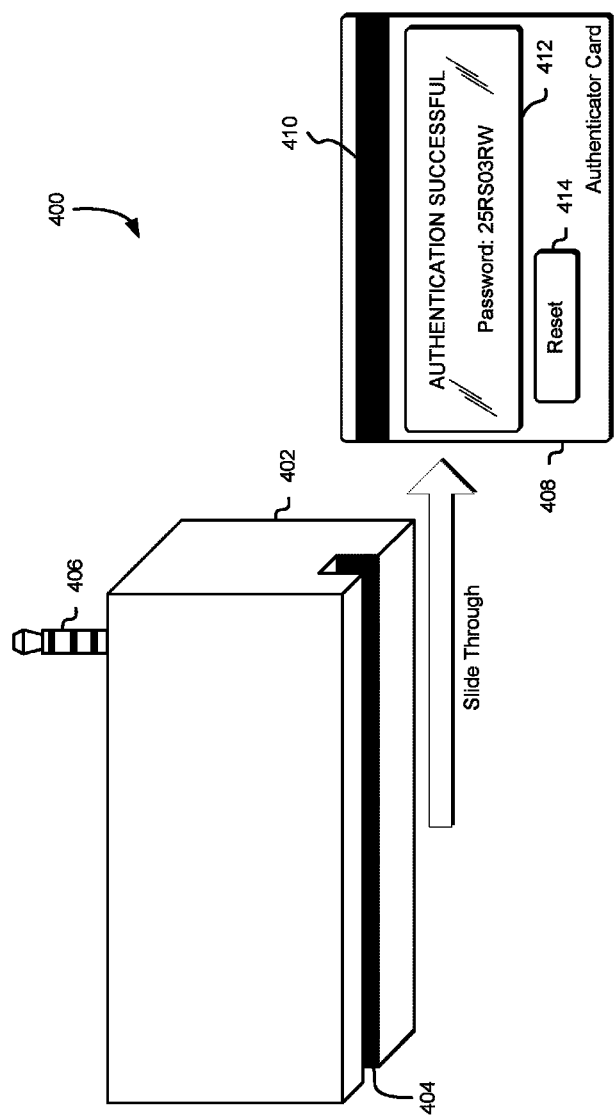
FIG. 4 shows an illustrative example of a credit card reader and an authenticator card configured to display a result for an authentication attempt in accordance with at least one embodiment.

In an alternative embodiment, the credit card reader does not comprise a display unit for displaying authentication information usable by the merchant to authenticate the credit card reader. Instead, in this particular embodiment, the authenticator reader comprises a display unit configured to display this authentication information received from the credit card reader. Accordingly, FIG. 4 shows an illustrative example of a credit card reader 402 and an authenticator card 408 configured to display a result for an authentication attempt in accordance with at least one embodiment. Similar to the credit card readers illustrated in FIGS. 2 and 3, the credit card reader 402 may comprise a credit card slot 404, which may be used to introduce one or more credit cards, an authenticator card 408 or other cards. The credit card reader 402 may further comprise a connector 406, which may be used to connect the credit card reader 402 to a mobile device in order to obtain an electrical charge necessary to power the credit card reader, as well as to transmit encrypted credit card information or other information to a payment processor, through the mobile device.

In an embodiment, the merchant utilizes an authenticator card 408, usable through the credit card slot 404 component of the credit card reader 402, to authenticate the credit card reader 402. The authenticator card 408 may comprise a plurality of components which, collectively, may enable a merchant to authenticate the credit card reader 402. For instance, the authenticator card 408 may comprise a magnetic strip 410 which may comprise a password or other credential information usable by the credit card reader 402 to determine whether to allow credit card transactions to be processed through the credit card reader 402. For instance, when the merchant slides the authenticator card 408 through the credit card slot 404, the credit card reader 402 may obtain the credential information stored within the magnetic strip 410 on the authenticator card 408. Accordingly, the credit card reader 402 may compare the received credential information from the authenticator card 408 to a stored, expected value for the credential information to determine whether there is a match. As noted above, if the credential information received does not result in a match, the credit card reader 402 may prevent the merchant from processing any credit card transactions until proper validation of the credential information is made. However, if there is a match, the credit card reader 402 may enable the merchant to process credit card transactions through the credit card reader 402. The credit card reader 402 may be configured to transmit the results of the authentication process to the authenticator card 408.

In an alternative embodiment, the credit card reader 402 may only be configured to provide a password or credential information stored therein to the authenticator card 408 when the merchant slides the authenticator card 408 through the credit card slot 404 on the credit card reader 402. Thus, in this particular embodiment, the credit card reader 402 does not perform any authentication processes but instead provides a unique password or credential information, supplied by the merchant to the payment processor and stored on the credit card reader 402, to the authenticator card 408. Thus, the merchant may be able to determine whether the password or credential information obtained from the credit card reader 402 matches the password or credential information provided to the payment processor and, accordingly, authenticate the credit card reader 402.

As illustrated in FIG. 4, the authenticator card 408 may comprise a display unit 412, which may be used to display a password or credential information obtained from the credit card reader 402. Accordingly, the authenticator card 408 may comprise a plurality of other hardware components, including a RAM chip or a hard drive, which may be collectively configured to provide this information to the merchant. For instance, the authenticator card 408 may be configured to persistently store a password or other credential information supplied by the merchant to the payment processor or other authorized dealer that provides credit card readers to one or more merchants. Thus, the authenticator card 408 may be configured to perform a comparison between the credential information stored therein and the credential information obtained from the credit card reader 402. If there is a match, the authenticator card 408 may transmit one or more signals to the display unit 412 which may cause the display unit 412 to display the merchant's specified password (e.g., "25RS03RW," as illustrated in FIG. 4). Alternatively, if the credit card reader 402 is configured to perform the validation of the credential information received from the authenticator card 408, through the magnetic strip 410, the credit card reader 402 may transmit the results of the validation process to the authenticator card 408 which, in turn, may transmit signals to the display unit 412 to cause the display unit 412 to provide these results to the merchant.

In some embodiments, the magnetic strip 410 can be configured to be re-writable such that the credential information stored within the magnetic strip 410 can be dynamically updated. For instance, if the authenticator card 408 comprises a wireless interface, the authenticator card 408 may obtain updated credential information, through the wireless interface, which may be stored on the magnetic strip 410. This updated credential information may be generated using any number of sources (e.g., transaction history of a merchant and/or clerk utilizing the credit card reader 402, contemporaneous update from a payment processor, etc.).

The authenticator card 408 may further include one or more user interface devices 414, such as the reset button illustrated in FIG. 4. Similar to the user interface devices described above in connection with FIGS. 2 and 3, the user interface devices 414 on the authenticator card 408 may be used to reset the authenticator card 408 such that the authenticator card 408 may be usable to re-authenticate the credit card reader 402 or any other credit card readers that may be provided to the merchant. Other user interface devices 414 may include a volume button for increasing or decreasing the volume of a sound output from the authenticator card 408, a display contrast button for configuring the display unit 412, and the like.

Figure 5:
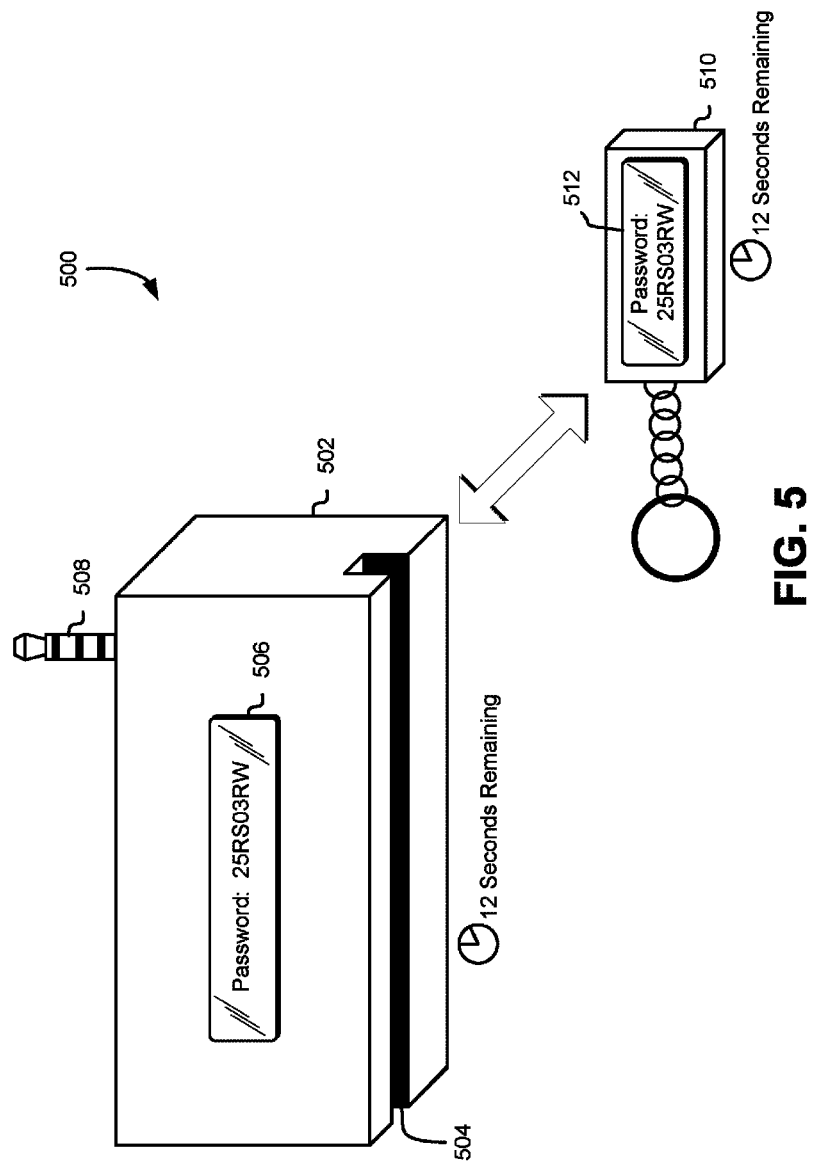
FIG. 5 shows an illustrative example of a credit card reader and a one-time password token configured to display one-time passwords synchronously in accordance with at least one embodiment.

In another embodiment, the credit card reader is configured to display one or more one-time passwords, which a merchant using a one-time password token may utilize to determine whether the credit card reader is authentic. Accordingly, FIG. 5 shows an illustrative example of a credit card reader 502 and a one-time password token 510 configured to display one-time passwords synchronously in accordance with at least one embodiment. Similar to the credit card readers illustrated in FIGS. 2 and 3, the credit card reader 502 comprises a credit card slot 504, which may be used to enable a merchant to introduce one or more credit cards or other cards to the credit card reader 502. The credit card reader 502 may be configured to obtain information from each card that is introduced through the credit card slot 504. For instance, when a merchant slides a credit card through the credit card slot 504 to process a credit card transaction, the credit card reader 502, through the credit card slot 504, may obtain necessary information regarding the customer's credit account. Further, the credit card reader 502 may comprise a display unit 506 configured to display one-time passwords or other credential information that may be used, by a merchant or other user, to authenticate the credit card reader 502. Further, the credit card reader 502 may comprise a connector 508 which may be used to attach the credit card reader 502 to a mobile device through one or more ports on the mobile device. The connector 508 may be used to obtain an electrical charge from the mobile device, which may be used to provide power to the credit card reader 502. Additionally, the connector 508 may be used to transmit data from the credit card reader 502, through the mobile device, to a payment processor who may use the data to authorize credit card transactions made through the credit card reader 502.

In contrast to the credit card readers illustrated in FIGS. 2 and 3, the credit card reader 502 may be configured to transmit signals to the display unit 506 that may cause the display unit 506 to display one or more one-time passwords. Accordingly, the credit card reader 502 may comprise one or more hardware components, such as a RAM chip or a hard drive, which may be used by the credit card reader 502 to obtain a new one-time password after a period of time. For instance, the credit card reader 502 may be configured to communicate, through the mobile device or through hardware on the credit card reader 502 that enables communications through one or more communications networks, with a payment processor authentication server to obtain a new one-time password after a specified period of time. Alternatively, the credit card reader 502 may be configured to utilize one or more mathematical algorithms after a period of time to generate a new one-time password. Accordingly, each of the one-time passwords provided may have an expiration period, after which a new one-time password is displayed on the display unit 506.

In another instance, the credit card reader 502 may be configured to display a one-time password or other unique password when the merchant utilizes a user interface device (not shown) on the credit card reader 502 or in response to a triggering event, such as attachment of the credit card reader 502 to a mobile device. The display of this unique password may be pursuant to tamper-proof circuitry that may be included in the credit card reader 502. For instance, if an entity attempts to modify the credit card reader 502, such as re-writing one or more executable instructions stored within the credit card reader 502, the credit card reader 502 may no longer display unique passwords or one-time passwords. Methods for configuring the credit card reader 502 to prevent tampering of the credit card reader 502 include use of a physically unclonable function (PUF), which may be a hardware component installed within the credit card reader 502 whose physical characteristics cause it to uniquely use a particular code.

If the credit card reader 502 is configured to display one or more one-time passwords, the merchant may be provided with a one-time password token 510, which may also be configured to display one or more one-time passwords. The one-time password token 510 may comprise one or more hardware components that may be configured to collectively obtain and display one-time passwords. Accordingly, the one-time password token 510 may comprise a token display unit 512 that may be configured to display these one-time passwords. As with the credit card reader 502 described above, the one-time password token 510 may be configured to communicate, such as through one or more communications networks (e.g., the Internet), with a payment processor authentication server to obtain a new one-time password after a specified period of time. Alternatively, the one-time password token 510 may be configured to utilize one or more mathematical algorithms after a period of time to generate a new one-time password.

In order for the authentication process to be performed by the merchant, the one-time password token 510 and the credit card reader 502 may need to be synchronized such that both devices display the same one-time password at the same time. Thus, the credit card reader 502 and the one-time password token 510 may be configured to utilize the same mathematical algorithm at the same time interval to generate the same one-time password. Alternatively, the credit card reader 502 and the one-time password token 510 may be configured to communicate with the payment processor authentication server to obtain the same one-time password after a specified time period. For instance, as illustrated in FIG. 5, the credit card reader 502 and the one-time password token 510 may display the same one-time password, in this case "25RS03RW," for a period of time. Both the credit card reader 502 and the one-time password token 510 may be synchronized such that, after twelve seconds, a new one-time password is displayed on both devices. Since the credit card reader 502 and the one-time password token 510 may be configured to utilize the same mathematical algorithm and/or communicate with a payment process authentication service to obtain a new one-time password, both devices may display the same one-time password after twelve seconds have elapsed.

Figure 6:
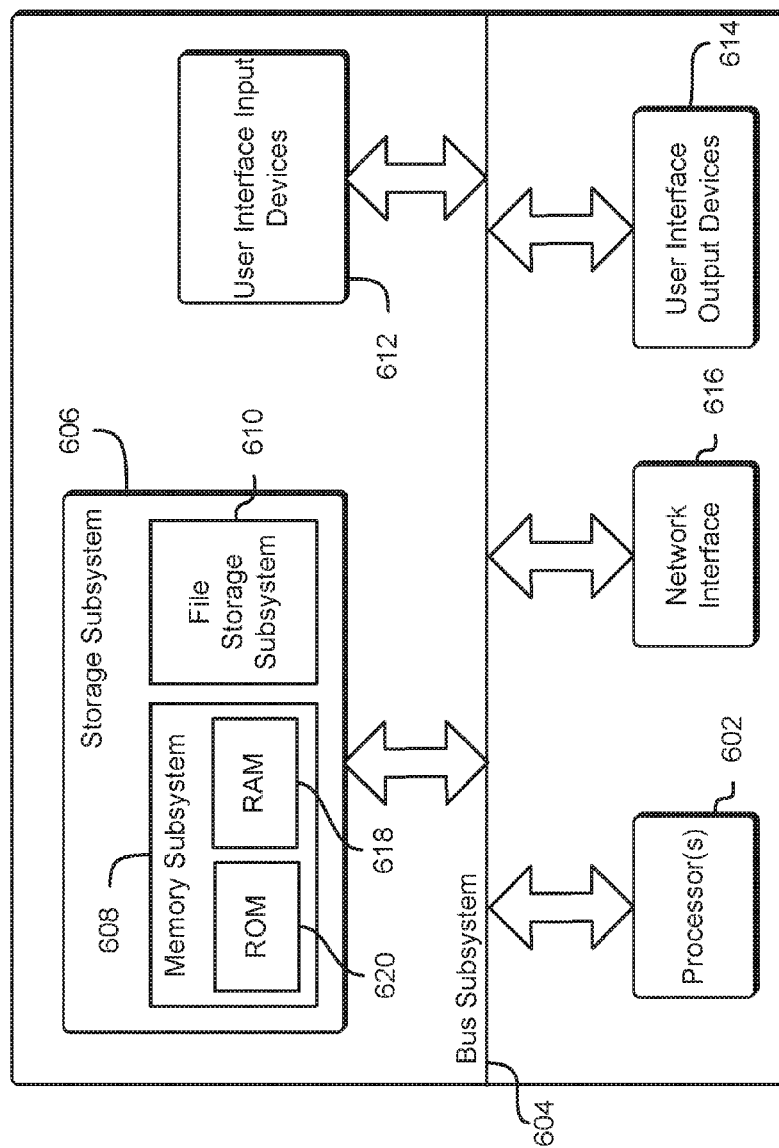
FIG. 6 shows an illustrative example of an example credit card reader system that may be used in accordance with at least one embodiment.

As noted above, the credit card reader may comprise a plurality of hardware components which may collectively be configured to process one or more credit card transactions, as well as verify that a merchant is authorized to utilize the credit card reader. Accordingly, FIG. 6 shows an illustrative example of an example credit card reader system 600 that may be used in accordance with at least one embodiment. In various embodiments, the credit card reader system 600 may be used to implement any of the systems illustrated herein and described above. For example, the credit card reader system 600 may be used to receive customer credit card information, submit, through a mobile device, the received credit card information to a payment processor system, receive authentication information from a merchant through the merchant's use of an authenticator card, determine whether received authentication information matches expected values for such authentication information, detect when a card has been introduced through the credit card slot, transmit one or more signals through a connector, process one or more signals, display authentication results on a display, and/or perform other activities. As shown in FIG. 6, the credit card reader system 600 may include one or more processors 602 that may be configured to communicate with and are operatively coupled to a number of peripheral subsystems via a bus subsystem 604. These peripheral subsystems may include a storage subsystem 606, comprising a memory subsystem 608 and a file storage subsystem 610, one or more user interface input devices 612, one or more user interface output devices 614, and a network interface subsystem 616.

The bus subsystem 604 may provide a mechanism for enabling the various components and subsystems of device system 600 to communicate with each other as intended. Although the bus subsystem 604 is shown schematically as a single bus, alternative embodiments of the bus subsystem may utilize multiple busses.

The network interface subsystem 616 may provide an interface to other device systems and networks. The network interface subsystem 616 may serve as an interface for receiving data from and transmitting data to other systems from the credit card reader system 600. For example, the network interface subsystem 616 may enable a merchant to connect the credit card reader to a wireless network such that the credit card reader may be able to transmit and receive data while in a remote location, such as a merchant's place of business. For example, as noted above in connection with FIG. 5, the credit card reader may be configured to communicate with a payment processor authentication server to obtain a new one-time password. Additionally, the credit card reader may be configured to receive transmissions from the payment processor (e.g., information regarding the customer's credit card account, additional authorizations, etc.) through a similar wireless access point. The network interface subsystem 616 may also facilitate the receipt and/or transmission of data on other networks.

The user interface input devices 612 may include one or more buttons as illustrated in FIGS. 2 and 3, a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the device system 600.

User interface output devices 614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the device system 600. The output device(s) 614 may be used, for example, to present user interfaces to facilitate user interaction with applications performing processes described herein and variations therein, when such interaction may be appropriate.

The storage subsystem 606 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, may be stored in the storage subsystem 606. These application modules or instructions may be executed by the one or more processors 602.

The storage subsystem 606 may additionally provide a repository for storing data used in accordance with the present disclosure. The storage subsystem 606 may comprise a memory subsystem 608 and a file/disk storage subsystem 610.

The memory subsystem 608 may include a number of memories including a main random access memory (RAM) 618 for storage of instructions and data during program execution and a read only memory (ROM) 620 in which fixed instructions may be stored. The file storage subsystem 610 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The credit card reader system 600 may be of various types including a portable computer device, tablet computer, a workstation, or any other data processing system that may provide portability for a merchant or other user of the device. Additionally, the credit card reader system 600 may include one or more connectors (e.g., USB, a headphone jack, Lightning® connector, etc.) that may be used to connect the credit card reader system 600 to another device. Due to the ever-changing nature of computers and networks, the description of the credit card reader system 600 depicted in FIG. 6 is intended only as a specific example for purposes of illustrating the preferred embodiment of the credit card reader. Many other configurations having more or fewer components than the system depicted in FIG. 6 are possible.

Figure 7:
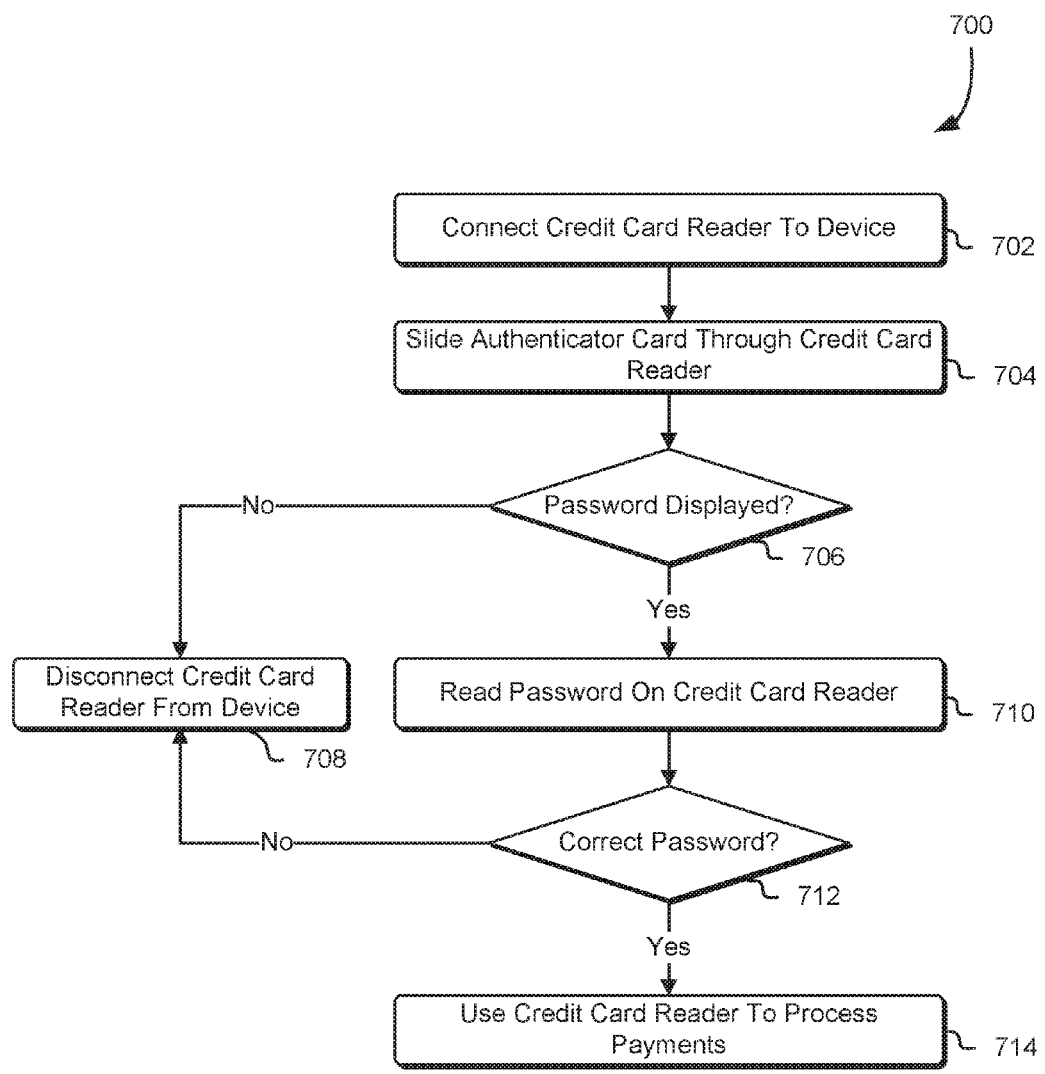
FIG. 7 shows an illustrative example of a process for authenticating a credit card reader using an authentication card in accordance with at least one embodiment.

FIG. 7 shows an illustrative example of a process 700 for authenticating a credit card reader using an authentication card in accordance with at least one embodiment. The process 700 may be performed by a merchant or other user of a credit card reader according to the present disclosure. The merchant or other user of the credit card reader may have received an authenticator card, comprising authentication information which may be necessary to activate the credit card reader, when the credit card reader was provided to the merchant or other user. Accordingly, the credit card reader may be configured to persistently store expected values for credential information which may be used to compare the authentication information stored in the authenticator card and these expected values. Further, the credit card reader may be configured, by the payment processor or other authorized dealer, to persistently store a unique password or credential information, provided by the merchant to the payment processor or other authorized dealer upon requesting a new credit card reader.

When the merchant or other user first receives the credit card reader, either from the payment processor/authorized dealer or from another entity, the merchant or other user may connect 702 the credit card reader to a mobile device. As noted above, the credit card reader may comprise one or more connectors, such as the connector illustrated in FIGS. 2-5, which may be used to attach the credit card reader to the mobile device. Accordingly, when the merchant attaches the credit card reader to the mobile device, the credit card reader may receive, through the connector, an electrical charge which may be used to power the credit card reader. Further, once the credit card reader has been turned on, the credit card reader may be configured to begin transmitting one or more signals, through the connector, to the mobile device. The credit card reader may be configured to provide information to the merchant or other user that the credit card reader has been successfully connected to the mobile device. For instance, if the credit card reader comprises a display unit, the credit card reader may transmit signals to the display unit that may cause the display unit to provide information to the merchant or other user that the connection was successful.

Once the merchant or other user has successfully connected the credit card reader to the mobile device, the merchant or other user may slide 704 an authenticator card through a credit card slot on the credit card reader. As noted above, the authenticator card may comprise a magnetic strip which may comprise a password or other credential information usable by the credit card reader to determine whether the merchant or other user is authorized to utilize the credit card reader to process one or more credit card transactions through the credit card reader. Accordingly, when the merchant or other user slides the authenticator card through the credit card slot, the credit card reader may obtain the password or other credential information stored on the authenticator card and determine whether the password or other credential information matches an expected value for the password or other credential information. Based at least in part on this comparison, the credit card reader may transmit one or more signals to a display unit on the credit card reader that may cause the display unit to display a second password or credential information that may be used by the merchant or other user to authenticate the credit card reader. As noted above, this second password or credential information may be provided by the merchant or other user to the payment processor or other authorized dealer when requesting a new credit card reader. Accordingly, this second password or credential information may be persistently stored within the credit card reader prior to providing the credit card reader to the merchant or other user.

Thus, the merchant or other user may view the display unit on the credit card reader to determine 706 if a password is displayed after sliding the authenticator card through the credit card reader. If, upon sliding the authenticator device through the credit card reader, no password or other credential information is displayed on the display unit, the merchant or other user may disconnect 708 the credit card reader from the mobile device. The failure to display a password or other credential information on the display unit may serve to indicate that the credit card reader may be defective, damaged, tampered with, unable to read the authenticator card, or subject to some other malfunction.

However, if a password or other credential information is displayed on the credit card reader, the merchant or other user may read 710 the displayed password or credential information on the credit card reader. Accordingly, the merchant or other user may utilize the displayed password or credential information to determine 712 whether the displayed password or credential information is correct (e.g., matches the password or other credential information provided to the payment processor or other authorized dealer when a credit card reader was requested). As noted above, the password or credential information provided to the payment processor or other authorized dealer to be used in this process 700 or generated by the payment processor or other authorized dealer and provided to the merchant or other user may be unique to the merchant or other user. Thus, if the credit card reader does not display the correct password or other credential information once the merchant or other user slides the authenticator card through the credit card reader, the merchant or other user may suspect that the credit card reader is not authentic or has been damaged and/or tampered with. Accordingly, the merchant or other user may disconnect 708 the credit card reader from the mobile device.

If the merchant or other user views the display unit on the credit card reader and determines that the displayed password or other credential information is correct, the merchant or other user may be satisfied that the credit card reader is authentic and may be used for processing credit card transactions. Thus, if the correct password or other credential information is displayed, the merchant or other user may use 714 the credit card reader to begin processing credit card transactions through the credit card reader.

Figure 8:
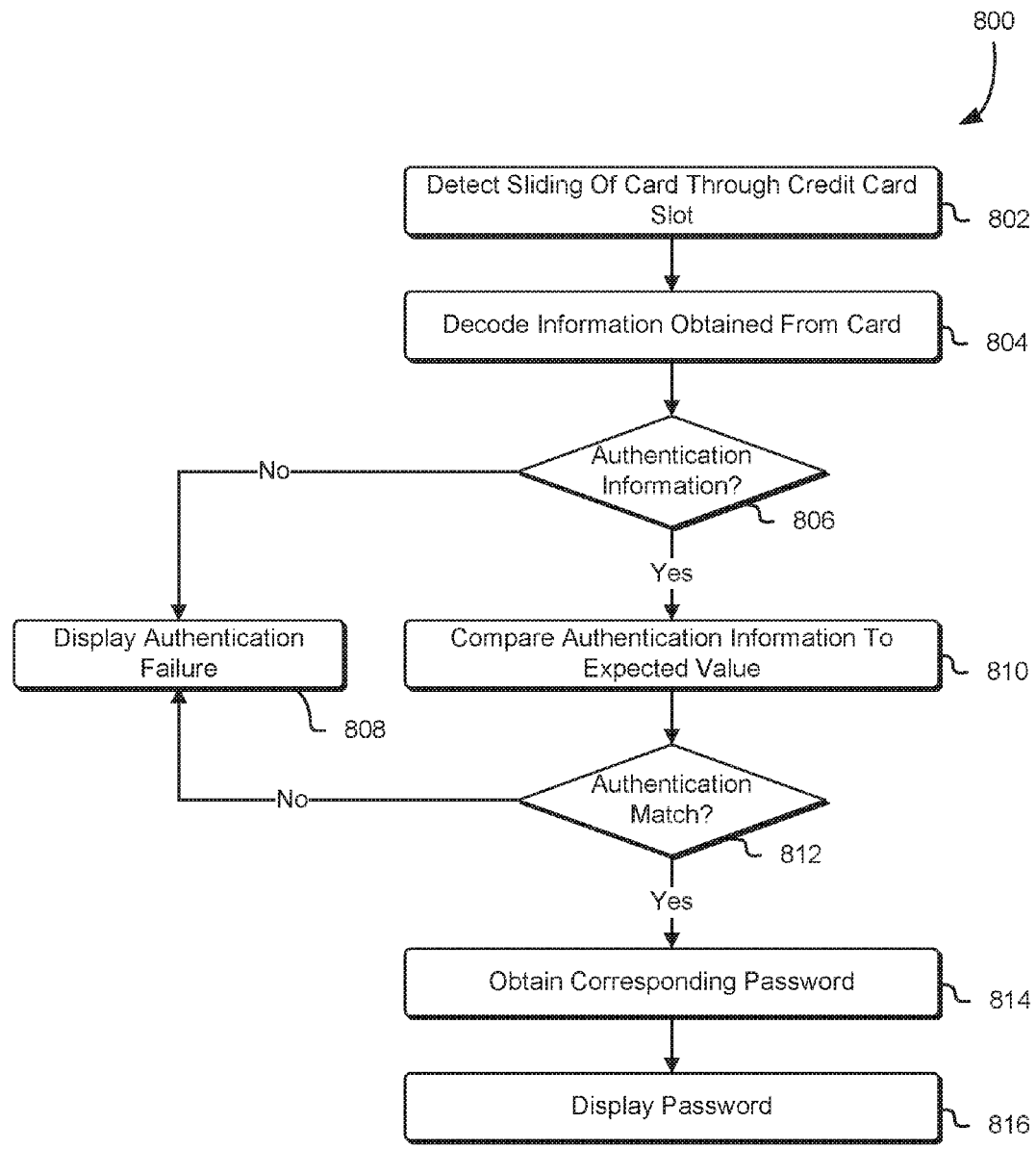
FIG. 8 shows an illustrative example of a process for displaying an authentication password in accordance with at least one embodiment.

As noted above, the credit card reader may be configured to verify that the merchant or other user is authorized to utilize the credit card reader for credit card transactions based at least in part on a password or credential information that may be provided to the credit card reader through use of an authenticator card. Accordingly, FIG. 8 shows an illustrative example of a process 800 for displaying an authentication password based at least in part on credential information received through an authenticator card in accordance with at least one embodiment. The process 800 may be performed by a credit card reader configured to obtain, from an authenticator card, data comprising a password or other credential information that may be used to determine whether a merchant or other user may utilize the credit card reader to process credit card transactions. Further, the credit card reader may be configured to display a second password or other credential information through a display unit on the credit card reader, which may be used by the merchant or other user to verify that the credit card reader is authentic.

As noted above, a merchant or other user may attach the credit card reader to a mobile device by inserting a connector on the credit card reader into one or more ports on the mobile device. The connector may be configured to transmit an electrical charge to the credit card reader once the attachment has been made to the mobile device. Accordingly, the credit card reader may be ready for use once the initial attachment has been established. Once the credit card reader has been attached to the mobile device, the merchant or other user may slide an authenticator card or other card through the credit card slot on the credit card reader to activate the credit card reader. Accordingly, the credit card reader may detect 802 the sliding of a card through the credit card slot.

The authenticator card or other card may comprise a magnetic strip or other media which may comprise data readable by the credit card reader. For instance, if the authenticator card or other card comprises a magnetic strip, the magnetic strip may comprise data, encoded using north/south pole directions for the magnets included in the magnetic stripe. Accordingly, the credit card reader may be configured to decode 804 the information included in the magnetic strip or other media in order to evaluate the obtained information. For instance, data that may be included in a magnetic strip or other media on a credit card, authenticator card or other types of cards may include, but are not limited to, credit card account information (e.g., an account holder's name, account number, expiration date, credit limit, etc.), authentication information (e.g., a password or other credential information for activation of the credit card reader) or other information.

Accordingly, the credit card reader may determine 806 whether the information obtained from the authenticator card or other type of card, decoded by the credit card reader, comprises authentication information. For instance, the payment processor may implement a default format for all authentication information that is to be used with all credit card readers. Accordingly, the credit card reader may be configured to analyze the obtained information to determine whether the obtained information conforms to this default format. If the credit card reader determines that the obtained information does not comprise authentication information, the credit card reader may transmit one or more signals to a display unit that, when processed by the display unit, may cause the display unit to display 808 that the authentication of the credit card reader has failed. The display unit may be configured to further provide the merchant or other user with additional information regarding the authentication failure, namely the reason why a failure occurred and further guidance.

In an alternative embodiment, if the credit card reader determines that the obtained information does not comprise authentication information, the credit card reader may transmit one or more signals to a display unit that, when processed by the display unit, may cause the display unit to display erroneous information. As noted above, this erroneous information may be formatted to appear to be authentication information such that an unauthorized user of the credit card reader may not be able to discern that the information displayed is erroneous. Thus, if the unauthorized user of the credit card reader subsequently attempts to utilize the credit card reader to process credit card transactions, the credit card reader may transmit this credit card information to a law enforcement agency, a payment processor security group or other security agency.

If the credit card reader determines that the information obtained from the authenticator card or other card does comprise authentication information, the credit card reader may compare 810 the authentication information to an expected value for authentication information. As noted above, when a merchant or other user obtains a credit card reader from a payment processor or other authorized dealer, he/she may also receive an authenticator card that may be paired such that both the authenticator card and the credit card reader comprise some identical data. Accordingly, the payment processor or other authorized dealer may include, within the authenticator card, a password or other credential information that may be used to activate the credit card reader. Additionally, the credit card reader may be configured to also include this same password or other credential information, which may serve as an expected value for the authentication information when obtaining information from an authenticator card or other card during an initial attachment of the credit card reader to a mobile device.

Accordingly, the credit card reader may determine 812 whether the authentication information obtained from the authenticator card or other type of card matches the expected value for the password or other credential information persistently stored on the credit card reader. If the authentication information obtained from the authenticator card or other type of card, when evaluated by the credit card reader, does not produce a match, the credit card reader may transmit signals to the display unit that may cause the display unit to display 810 a message indicating that there was an authentication failure.

If the authentication information obtained from the authenticator card or other type of card do produce a match with the expected value for the authentication information persistently stored within the credit card reader, the credit card reader may obtain 814 a corresponding password, associated with the merchant or other user, persistently stored within the credit card reader. As noted above, when the merchant or other user of the credit card reader submits a request to a payment processor or other authorized dealer of credit card readers to obtain a new credit card reader, the payment processor or other authorized dealer may require that the merchant or other user provide a password that is unique to the merchant or other user. Alternatively, the payment processor or other authorized dealer may provide the merchant or other user with a password or other credential information that is unique to this particular merchant or other user. This password or other credential information may be persistently stored within the credit card reader prior to delivery to the merchant or other user.

Accordingly, once the credit card reader has obtained the corresponding password or other credential information unique to the merchant or other user, the credit card reader may transmit one or more signals to the display unit that, when processed by the display unit, may cause the display unit to display 816 the corresponding password or other credential information. This may enable the merchant or other user to view the corresponding password or other credential information and verify that the credit card reader is authentic and usable for processing credit card transactions.

Figure 9:
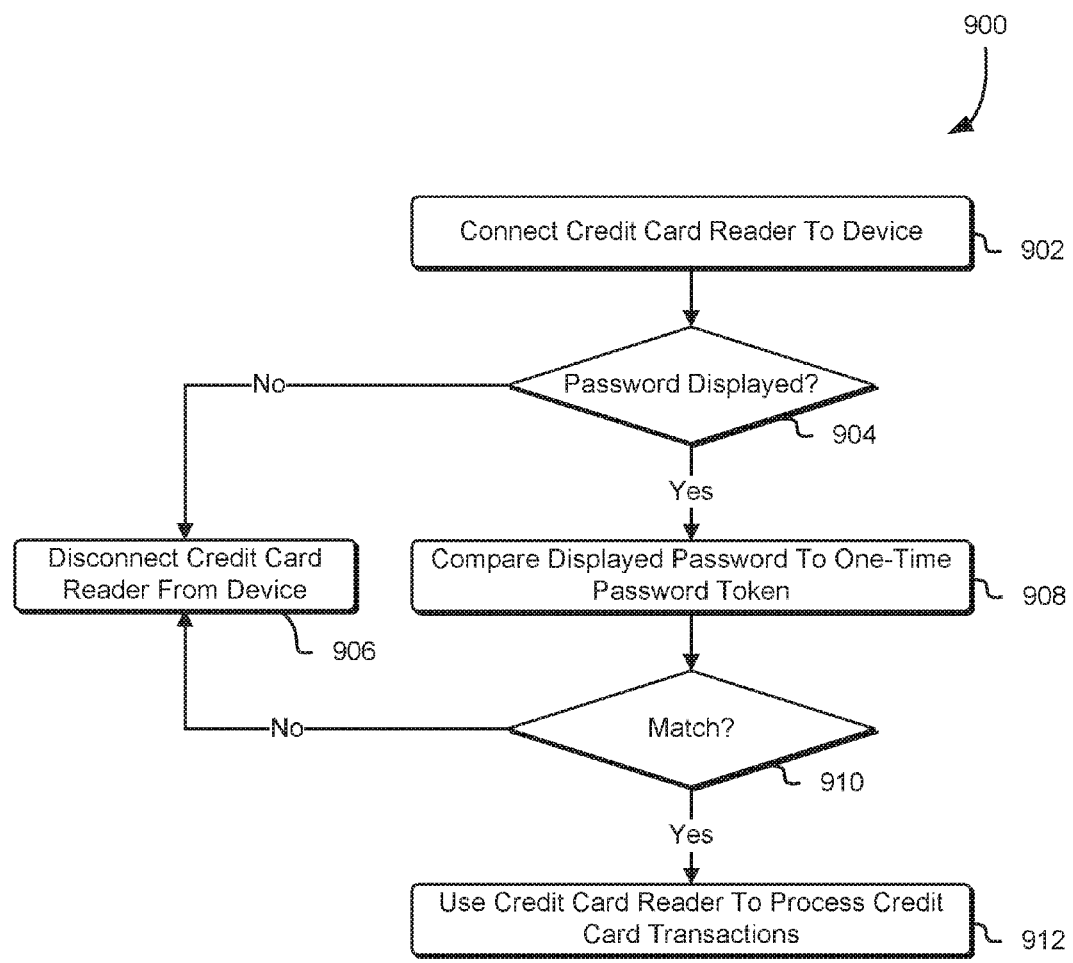
FIG. 9 shows an illustrative example of a process for authenticating a credit card reader using a one-time password token in accordance with at least one embodiment.

As noted above, in an embodiment, the credit card reader is configured to display one or more one-time passwords, which may be updated at particular time intervals. Further, the credit card reader may be configured to operate synchronously with a one-time password token provided to the merchant or other user such that the merchant or other user may verify that the credit card reader is authentic. Accordingly, FIG. 9 shows an illustrative example of a process 900 for authenticating a credit card reader using a one-time password token in accordance with at least one embodiment. The process 900 may be performed by a merchant or other user that utilizes a credit card reader to process one or more credit card transactions at the point of sale. Additionally, the merchant or other user may have been provided with a one-time password token which may be configured to obtain new one-time passwords at a particular time interval and to operate synchronously with the credit card reader.

As noted above, when the merchant or other user first receives the credit card reader, either from the payment processor/authorized dealer or from another entity, the merchant or other user may connect 902 the credit card reader to a mobile device. The credit card reader may comprise one or more connectors which may be used to attach the credit card reader to the mobile device. Accordingly, when the merchant attaches the credit card reader to the mobile device, the credit card reader may receive, through the connector, an electrical charge which may be used to power the credit card reader. Further, once the credit card reader has been turned on, the credit card reader may be configured to begin transmitting one or more signals, through the connector, to the mobile device. The credit card reader may be configured to provide information to the merchant or other user that the credit card reader has been successfully connected to the mobile device. For instance, if the credit card reader comprises a display unit, the credit card reader may transmit signals to the display unit that may cause the display unit to provide information to the merchant or other user that the connection was successful.

Once the credit card reader has been connected to the mobile device, the credit card reader may communicate, through the mobile device, with a payment processor authentication server to obtain a one-time password. Alternatively, the credit card reader may communicate with a communications network server to obtain an accurate date and time usable to determine which one-time password to display on the display unit. For instance, the credit card reader may include one or more mathematical algorithms usable to calculate a one-time password based at least in part on the date and time, past one-time passwords utilized or other criteria. Accordingly, the merchant or other user may view the display unit on the credit card reader to determine 904 whether a one-time password is displayed on the display unit. If the display unit does not display a one-time password, the merchant or other user may disconnect 906 the credit card reader from the mobile device. For instance, the display unit may not display a one-time password if the credit card device is not authentic or the credit card device has been damaged, tampered with or disabled.

As noted above, when the merchant or other user obtains the credit card reader from a payment processor or other authorized dealer, the merchant or other user may also receive a one-time password token from the payment processor or other authorized dealer. The one-time password token may be configured to communicate with a payment processor authentication server to obtain a one-time password after a certain period of time. Alternatively, the one-time password token may include one or more mathematical algorithms usable to generate one or more one-time passwords over a certain period of time. The one-time password token may be configured to perform synchronously with the credit card reader such that, if the credit card reader is authentic, both the credit card reader and the one-time password token may display the same one-time password and update to a new one-time password at the same time. Accordingly, if the credit card reader does display, through the display unit, a one-time password, the merchant or other user may compare 908 the displayed one-time password to the one-time password on the one-time password token to determine 910 whether the one-time passwords match.

If the one-time password displayed on the credit card reader and the one-time password token match, the merchant or other user may determine that the credit card reader is authentic. Thus, the merchant or other user may use 912 the credit card reader to process one or more credit card transactions at the point of sale. Alternatively, if the one-time password displayed on the credit card reader and the one-time password token do not match, the merchant or other user may determine that the credit card reader is not authentic and thus not suitable for his/her needs. Accordingly, the merchant or other user may disconnect 910 the credit card reader from the mobile device.

Figure 10:
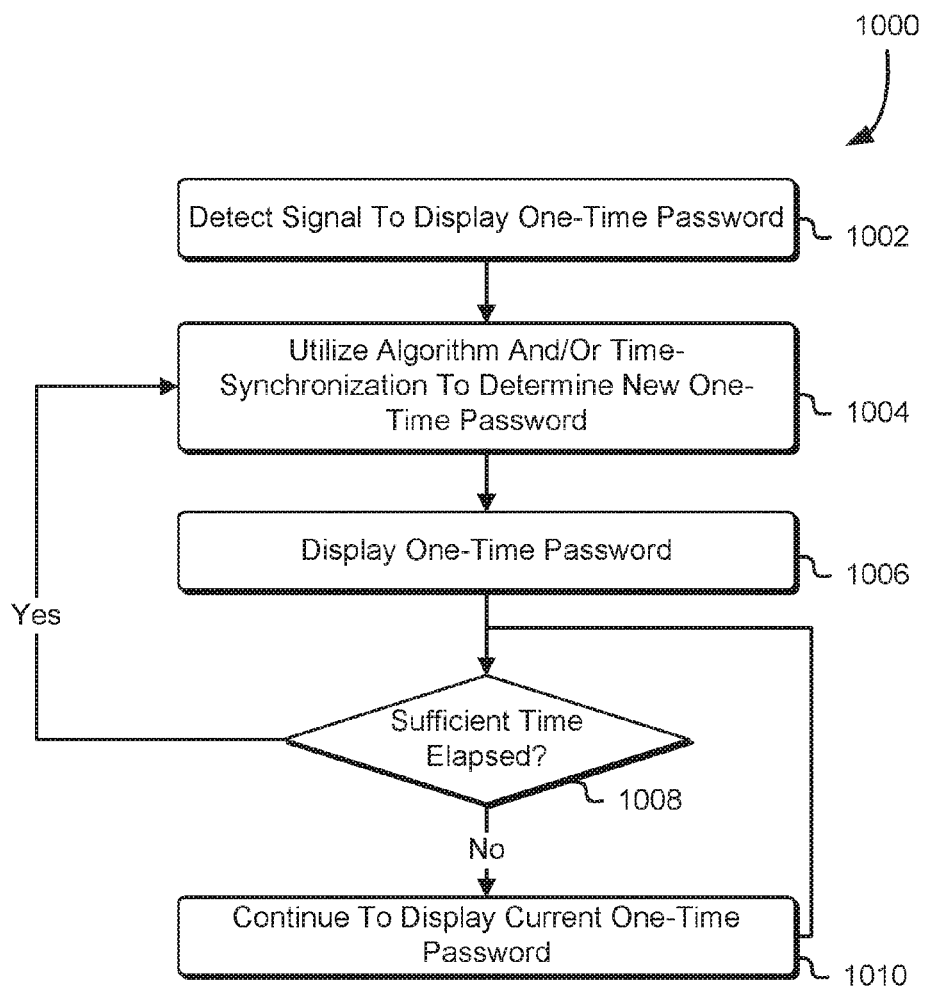
FIG. 10 shows an illustrative example of a process for displaying one-time passwords for authentication of a credit card reader in accordance with at least one embodiment.

As noted above, the credit card reader may be configured to display one-time passwords, which may be used by a merchant or other user to authentic the credit card reader by comparing the one-time password to a second one-time password displayed on a one-time password token. Accordingly, FIG. 10 shows an illustrative example of a process 1000 for displaying one-time passwords for authentication of a credit card reader in accordance with at least one embodiment. The process 1000 may be performed by a credit card reader configured to obtain or generate one-time passwords and display these one-time passwords on a display unit installed on the credit card reader.

When a merchant or other user initially attaches the credit card reader to a mobile device, the credit card reader may receive, through a connector used to attach the credit card reader to the mobile device, an electrical charge which may cause the credit card reader to power on and perform one or more operations. Accordingly, once the credit card reader has received this electrical charge and has powered on, the credit card reader may detect 1002 one or more signals which may cause the credit card reader to display a one-time password. The one or more signals may be received from a variety of sources. For instance, the credit card reader may be configured to communicate with a payment processor authentication server to acknowledge that it has been powered on and is available. Accordingly, the payment processor authentication server may transmit one or more executable instructions to the credit card reader to begin displaying one-time passwords. Alternatively, the credit card reader may be configured to communicate with one or more communications network servers to obtain an accurate date and time. This may cause the credit card reader to begin generating one-time passwords based at least in part on the current date and time and/or a mathematical algorithm stored therein.

Accordingly, the credit card reader may utilize 1004 a mathematical algorithm and/or time synchronization with a payment processor authentication server to determine a new one-time password. As noted above, the credit card reader may be configured to communicate, using the mobile device and through one or more communications networks, with a payment processor authentication server to obtain a one-time password. These one-time passwords may be generated based at least in part on the date and time at which the request for the one-time password was submitted to the payment processor authentication server. Alternatively, the credit card reader may be configured to utilize one or more mathematical algorithms to calculate and generate the new one-time password.

Once the credit card reader has either obtained a new one-time password from the payment processor authentication server or has generated a new one-time password by utilizing a mathematical algorithm, the credit card reader may transmit one or more signals to a display unit that, when processed by the display unit, may cause the display unit to display 1006 the one-time password. As noted above, a merchant or other user may be provided with a one-time password token which may be configured to operate synchronously with the credit card reader to obtain new one-time passwords. Thus, the merchant or other user may utilize the one-time password token to compare the one-time password displayed on the token to the one-time password displayed on the credit card reader. This may enable the merchant or other user to verify that the credit card reader is authentic and usable to process one or more credit card transactions.

As noted above, the credit card reader may be configured to obtain a new one-time password after a particular period of time. Thus, each one-time password displayed on the credit card reader may expire after this particular period of time and may no longer be usable to authenticate the credit card reader. Accordingly, the credit card reader may determine 1008 whether a sufficient amount of time has elapsed since the one-time password was initially displayed. If a sufficient amount of time has elapsed, the credit card reader may again utilize 1004 a mathematical algorithm and/or time-synchronization with a payment processor authentication server to generate a new one-time password. However, if a sufficient amount of time has not elapsed, the credit card reader may continue 1010 to display the current one-time password until the particular amount of time has elapsed.

Figure 11:
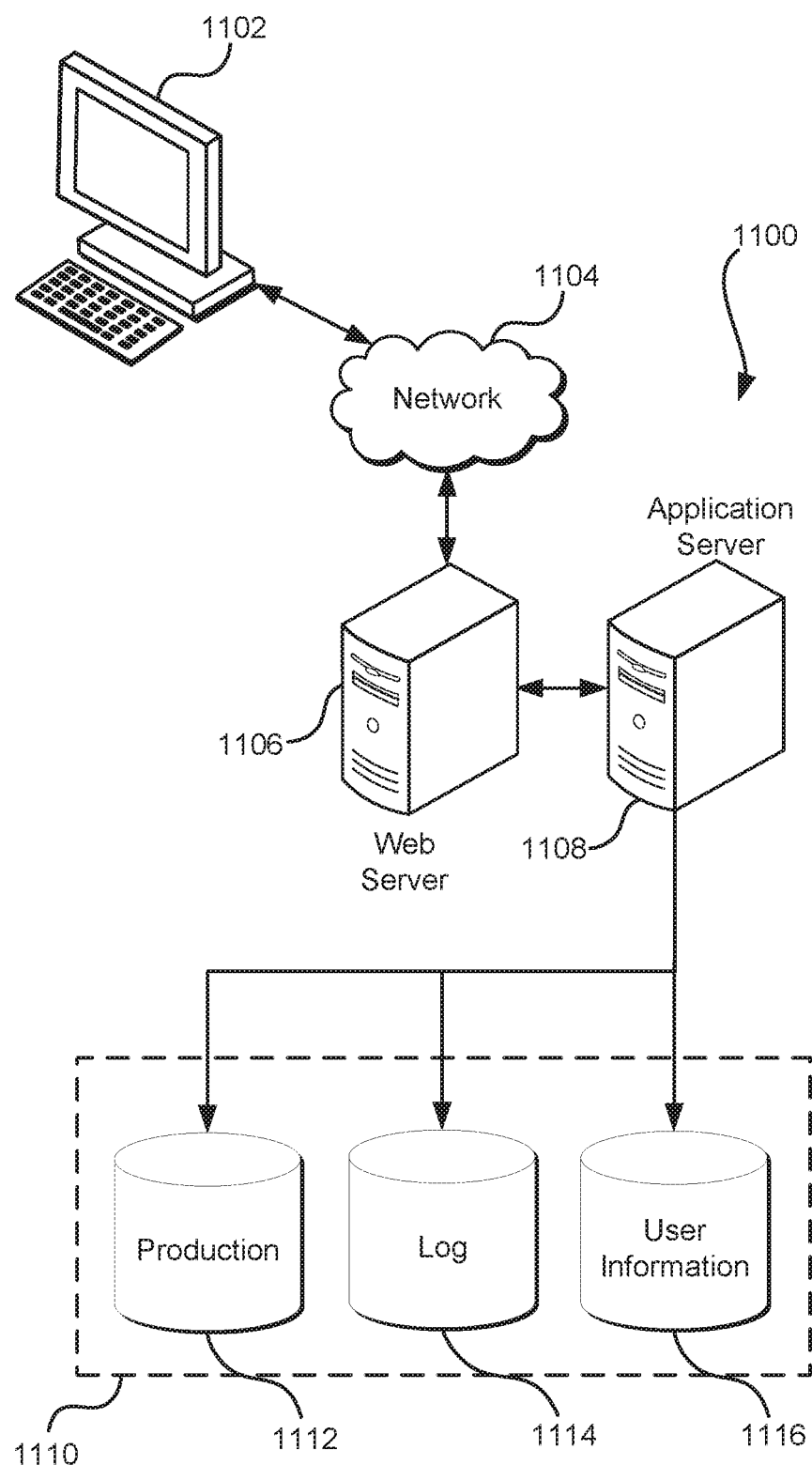
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these, and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad), and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An authenticator card device comprising:
   a card;
   a display unit engaged with the card so as to be visible from outside of the card;
   a magnetic strip comprising data in a form of magnetic pole orientations along the magnetic strip;
   one or more processors that are operatively coupled with the display unit; and
   memory including instructions executable by the one or more processors that when executed by the one or more processors cause the one or more processors to:
      receive first information that is based at least in part on information stored within a payment card reader device through the magnetic strip;
      determine whether the first information and second information stored within the memory match; and
      cause the display unit to display authentication information based at least in part on whether the first information and second information match, the authentication information usable from outside of the authenticator card device to authenticate the payment card reader device.

2. The authenticator card device of claim 1, further comprising the payment card reader device, the payment card reader device comprising:
- a housing;
- a connector configured to removably engage a mobile device from outside of the housing;
- a card slot engaged with the housing configured to removably receive the card;
- one or more processors that are operatively coupled with the connector and the card slot; and
- device memory including instructions executable by the one or more processors that when executed by the one or more processors cause the one or more processors to:
  - detect presence of the card in the card slot;
  - transmit the first information to the card; and
  - enable data to be transmitted through the connector.

3. The authenticator card device of claim 1, wherein the memory further causes the one or more processors to cause the display unit to indicate an authentication failure as a result of a determination that the first information and the second information do not match.

4. The authenticator card device of claim 1, wherein the authentication information comprises information specific to a user of the card.

5. A computer-implemented method, comprising:
  under the control of an authenticator card device configured with executable instructions,
    receiving, through contact with a hardware component of a payment authorization instrument reader, first information from the payment authorization instrument reader;
    deriving second information based at least in part on the first information, the second information usable by a user of the payment authorization instrument reader to authenticate the payment authorization instrument reader; and
    providing, through an output device of the authenticator card device, the second information.

6. The computer-implemented method of claim 5, wherein the second information comprises credential information specific to a user of the authenticator card device.

7. The computer-implemented method of claim 5, wherein the second information is derived by processing the first information through one or more key derivation functions.

8. The computer-implemented method of claim 5, wherein the second information comprises an expected value for credential information stored within the payment authorization instrument reader provided to a user of the authenticator card device.

9. The computer-implemented method of claim 5, wherein the hardware component of the payment authorization instrument reader is a slot, engaged with a housing of the payment authorization instrument reader, shaped to removably receive:
- a payment authorization instrument comprising readable media that, as a result of receiving the payment authorization instrument, can be used to obtain data from the readable media usable for payment authorization instrument transactions; and
- the authenticator card device to enable the authenticator card device to obtain the first information from the payment authorization instrument reader.

10. The computer-implemented method of claim 5, wherein the second information includes authentication failure information generated as a result of a determination that the first information and information stored within memory of the authenticator card device do not match.

11. The computer-implemented method of claim 5, wherein the second information includes erroneous information generated as a result of a determination that the first information and information stored within memory of the authenticator card device do not match.

12. The computer-implemented method of claim 5, further comprising enabling payment authorization instrument transactions through the payment authorization instrument reader based at least in part on the second information.

13. A non-transitory computer-readable storage medium having stored thereon executable instructions that, as a result of being executed by one or more processors of an authenticator card device, cause the authenticator card device to at least:
- in response to having received a first set of data through contact with a hardware component of a payment authorization instrument reader, perform one or more analyses based at least in part on the first set of data and a second set of data stored within the authenticator card device;
- provide, through one or more output devices of the authenticator card device, information based at least in part on results of the one or more analyses; and
- based at least in part on the results of the one or more analyses, determine whether to enable use of the payment authorization instrument reader for processing payment authorization instrument transactions.

14. The non-transitory computer-readable storage medium of claim 13, wherein the second set of data is an expected value for credential information stored within the authenticator card device.

15. The non-transitory computer-readable storage medium of claim 13, wherein the information provided through the one or more output devices of the authenticator card device comprises credential information specific to a user of the payment authorization instrument reader to enable the user to utilize the credential information to authenticate the payment authorization instrument reader.

16. The non-transitory computer-readable storage medium of claim 13, wherein:
- the one or more analyses includes determining whether the first set of data matches the second set of data; and
- use of the payment authorization instrument reader for processing the payment authorization instrument transactions is enabled as a result of the first set of data matching the second set of data.

17. The non-transitory computer-readable storage medium of claim 13, wherein the hardware component of the payment authorization instrument reader is a slot, engaged with a housing of the payment authorization instrument reader, shaped to removably receive:
- a payment authorization instrument comprising readable media that, as a result of receiving the payment authorization instrument, can be used to obtain data from the readable media usable for the payment authorization instrument transactions; and
- the authenticator card device to enable the authenticator card device to obtain the first set of data from the payment authorization instrument reader.

18. The non-transitory computer-readable storage medium of claim 13, wherein the information includes authentication failure information generated as a result of a determination that the first set of data and the second set of data do not match.

19. The non-transitory computer-readable storage medium of claim 13, wherein the information includes erroneous information generated as a result of generated as a result of a determination that the first set of data and the second set of data do not match.

20. The non-transitory computer-readable storage medium of claim 13, wherein the one or more output devices include a display unit engaged with the card so as to be visible from outside of the card.

\* \* \* \* \*